(12) United States Patent
Morris et al.

(10) Patent No.: US 11,525,401 B2
(45) Date of Patent: Dec. 13, 2022

(54) IMPINGEMENT BAFFLE FOR GAS TURBINE ENGINE

(71) Applicant: HONEYWELL INTERNATIONAL INC., Charlotte, NC (US)

(72) Inventors: Mark Morris, Phoenix, AZ (US); Blake Petersen, Phoenix, AZ (US); Jason Smoke, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/145,843

(22) Filed: Jan. 11, 2021

(65) Prior Publication Data

US 2022/0220896 A1     Jul. 14, 2022

(51) Int. Cl.
*F02C 7/18*      (2006.01)

(52) U.S. Cl.
CPC .......... *F02C 7/18* (2013.01); *F05D 2220/32* (2013.01); *F05D 2260/201* (2013.01)

(58) Field of Classification Search
CPC ... F02C 7/18; F05D 2220/32; F05D 2260/201
See application file for complete search history.

(56) References Cited

U.S. PATENT DOCUMENTS

| | | | |
|---|---|---|---|
| 4,916,906 A * | 4/1990 | Vogt | F23R 3/002 60/757 |
| 5,391,052 A | 2/1995 | Correia et al. | |
| 5,480,281 A | 1/1996 | Correia | |
| 5,586,866 A * | 12/1996 | Wettstein | F23R 3/002 416/96 A |
| 6,000,908 A | 12/1999 | Bunker | |
| 6,484,505 B1 * | 11/2002 | Brown | F23R 3/002 60/760 |
| 7,147,432 B2 | 12/2006 | Lowe et al. | |
| 7,681,398 B2 | 3/2010 | Patel et al. | |
| 8,001,792 B1 * | 8/2011 | Dvorak | F01D 9/045 29/889.22 |

(Continued)

FOREIGN PATENT DOCUMENTS

| | | |
|---|---|---|
| CN | 106949497 A | 7/2017 |
| EP | 3680452 A1 | 7/2020 |

(Continued)

*Primary Examiner* — David E Sosnowski
*Assistant Examiner* — Theodore C Ribadeneyra
(74) *Attorney, Agent, or Firm* — Lorenz & Kopf, LLP (57) ABSTRACT

An impingement baffle for directing a cooling fluid onto a target surface includes a baffle body having a first end opposite a second end, and a first side opposite a second side. The second side is spaced a distance apart from the target surface, with the distance varying from the first end to the second end. The baffle body defines impingement holes that extend through the baffle body from the first side to the second side. The impingement holes are spaced apart along the baffle body to receive the cooling fluid. The impingement baffle includes tubular extensions coupled to the second side. Each tubular extension is in fluid communication with a respective one of the impingement holes to direct the cooling fluid onto the target surface. Each tubular extension extends for a length from the second side, and the length of each tubular extension is based on the distance.

20 Claims, 7 Drawing Sheets

(56) References Cited

U.S. PATENT DOCUMENTS

| | | | |
|---|---|---|---|
| 8,127,553 | B2 | 3/2012 | Ekkad et al. |
| 8,348,602 | B2 | 1/2013 | Botrel et al. |
| 8,667,682 | B2* | 3/2014 | Lee .................. F01D 9/023 |
| | | | 60/39.01 |
| 9,976,441 | B2 | 5/2018 | Lacy et al. |
| 10,184,343 | B2* | 1/2019 | Lacy .................. F01D 9/041 |
| 10,253,986 | B2* | 4/2019 | Lacy .................. B33Y 80/00 |
| 10,370,981 | B2* | 8/2019 | Slavens ............. F01D 5/187 |
| 10,422,235 | B2 | 9/2019 | Bunker |
| 10,605,093 | B2* | 3/2020 | Hoskin .............. F01D 5/186 |
| 2003/0031555 | A1* | 2/2003 | Noe .................. F01D 5/189 |
| | | | 415/115 |
| 2005/0150632 | A1* | 7/2005 | Mayer ............... F01D 25/12 |
| | | | 165/47 |
| 2008/0101923 | A1* | 5/2008 | Botrel ............... F01D 11/24 |
| | | | 415/173.1 |
| 2008/0206042 | A1* | 8/2008 | Lee .................. F01D 5/143 |
| | | | 415/116 |
| 2008/0211192 | A1* | 9/2008 | Pietraszkiewicz ...... F01D 11/08 |
| | | | 277/347 |
| 2008/0271458 | A1 | 11/2008 | Ekkad et al. |
| 2009/0067994 | A1* | 3/2009 | Pietraszkiewicz .... F01D 25/246 |
| | | | 415/173.1 |
| 2013/0081401 | A1 | 4/2013 | Kim |
| 2016/0169515 | A1* | 6/2016 | Tu .................... F23R 3/06 |
| | | | 415/115 |
| 2016/0333735 | A1* | 11/2016 | Bunker ............... F01D 5/189 |
| 2017/0175577 | A1* | 6/2017 | Dutta ................ F01D 9/065 |
| 2020/0190989 | A1* | 6/2020 | Fujii ................. F01D 9/02 |
| 2020/0378305 | A1* | 12/2020 | Dudebout ........... F02C 7/18 |

FOREIGN PATENT DOCUMENTS

| | | |
|---|---|---|
| KR | 20190033255 A | 3/2019 |
| KR | 20190083836 A | 7/2019 |

\* cited by examiner

IMPINGEMENT BAFFLE FOR GAS TURBINE ENGINE

TECHNICAL FIELD

The present disclosure generally relates to gas turbine engines, and more particularly relates to an impingement baffle for directing a cooling fluid onto a target surface associated with a gas turbine engine.

BACKGROUND

Gas turbine engines may be employed to provide power to various devices. For example, a gas turbine engine may be employed as an auxiliary power unit to provide power to a mobile platform, such as an aircraft, tank, etc. In certain examples, gas turbine engines include a radial turbine positioned immediately downstream of a combustion section of the gas turbine engine. Generally, higher radial turbine inlet temperature and higher radial turbine speed are required to improve gas turbine engine efficiency. Increased speeds and higher temperatures, however, may increase a risk of oxidation and thermally induced fatigue of portions of the radial turbine.

Accordingly, it is desirable to provide an impingement baffle for directing a cooling fluid onto a target surface, such as portion of a radial turbine, to provide improved cooling of the radial turbine during the operation of the gas turbine engine. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an impingement baffle for directing a cooling fluid onto a target surface. The impingement baffle includes a baffle body having a first end opposite a second end, and a first side opposite a second side. The second side is spaced a distance apart from the target surface, with the distance varying between the second side and the target surface from the first end to the second end. The baffle body defines a plurality of impingement holes that extend through the baffle body from the first side to the second side. The plurality of impingement holes is spaced apart along the baffle body from the first end to the second end with each of the plurality of impingement holes configured to receive the cooling fluid. The impingement baffle includes a plurality of tubular extensions coupled to the second side of the baffle body. Each tubular extension of the plurality of tubular extensions is in fluid communication with a respective one of the plurality of impingement holes to direct the cooling fluid from the respective one of the plurality of impingement holes onto the target surface. Each tubular extension of the plurality of tubular extensions extends for a length from the second side, and the length of each tubular extension of the plurality of tubular extensions is based on the distance.

A density of the plurality of impingement holes and the plurality of tubular extensions increases from the first end toward the second end. The distance increases from proximate the first end to the second end of the baffle body, and the length associated with each tubular extension of the plurality of tubular extensions increases from the first end to the second end. A second distance is defined between a terminal end of each tubular extension of the plurality of tubular extensions and the target surface, and the second distance is substantially the same for each tubular extension of the plurality of tubular extensions. At least one of the plurality of impingement holes has an inlet configured to be in fluid communication with a source of the cooling fluid and an outlet spaced apart from the target surface and defined by a terminal end of a respective one of the plurality of tubular extensions, and the inlet includes a rounded entrance. The respective one of the plurality of tubular extensions converges from the inlet to the terminal end. The respective one of the plurality of tubular extensions is cylindrical. At least one of the plurality of impingement holes has an inlet configured to be in fluid communication with a source of the cooling fluid and an outlet spaced apart from the target surface and defined by a terminal end of a respective one of the plurality of tubular extensions, and the inlet includes a sharp corner. The respective one of the plurality of tubular extensions converges from the inlet to the terminal end. The respective one of the plurality of tubular extensions is cylindrical. The baffle body includes a planar portion proximate the first end and an angled portion defined between the planar portion and the second end. The plurality of impingement holes includes a plurality of first impingement holes associated with the planar portion and a plurality of second impingement holes associated with the angled portion, and the distance between the second side and the target surface along the planar portion is the same. The distance between the second side and the target surface along the angled portion increases from the planar portion to the second end. The plurality of tubular extensions are coupled to the plurality of second impingement holes. The plurality of second impingement holes and the plurality of tubular extensions are non-uniformly spaced about a perimeter of the baffle body along the angled portion. At least one of the plurality of second impingement holes and a respective one of the plurality of tubular extensions is radially aligned with an adjacent one of the plurality of second impingement holes and a respective adjacent one of the plurality of tubular extensions, and at least a second one of the plurality of second impingement holes and a respective second one of the plurality of tubular extensions is radially misaligned with a second adjacent one of the plurality of second impingement holes and a respective second adjacent one of the plurality of tubular extensions. The target surface is a surface of a back shroud associated with a radial turbine of a gas turbine engine.

Further provided is an impingement baffle for directing a cooling fluid onto a target surface. The impingement baffle includes a baffle body having a first end opposite a second end, and a first side opposite a second side. The baffle body includes a planar portion that extends from proximate the first end to an angled portion that extends from the planar portion to the second end. The second side along the angled portion is spaced a distance apart from the target surface that increases from the planar portion to the second end. The baffle body defines a plurality of impingement holes that extend through the baffle body from the first side to the second side. The plurality of impingement holes is spaced apart along the baffle body from the first end to the second end with each of the plurality of impingement holes configured to receive the cooling fluid. The impingement baffle includes a plurality of tubular extensions coupled to the second side of the baffle body along the angled portion. Each tubular extension of the plurality of tubular extensions is in fluid communication with a respective one of the plurality of impingement holes defined in the angled portion to direct the cooling fluid from the respective one of the plurality of impingement holes onto the target surface. Each tubular extension of the plurality of tubular extensions extends for a length from the second side such that a second distance defined between a terminal end of each tubular extension of the plurality of tubular extensions and the target surface is the same for each tubular extension of the plurality of tubular extensions.

A density of the plurality of impingement holes and the plurality of tubular extensions increases toward the second end along the angled portion, and the plurality of impingement holes and the plurality of tubular extensions are non-uniformly spaced about a perimeter of the baffle body along the angled portion. At least one of the plurality of impingement holes has an inlet configured to be in fluid communication with a source of the cooling fluid and an outlet spaced apart from the target surface and defined by the terminal end of a respective one of the plurality of tubular extensions, and the inlet includes a rounded entrance. The respective one of the plurality of tubular extensions converges from the inlet to the terminal end.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of cooling system that would benefit from an impingement baffle and the use of the impingement baffle for directing a cooling fluid onto a target surface associated with a gas turbine engine described herein is merely one exemplary embodiment according to the present disclosure. In addition, while the impingement baffle is described herein as being used with a target surface associated with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

Figure 1:
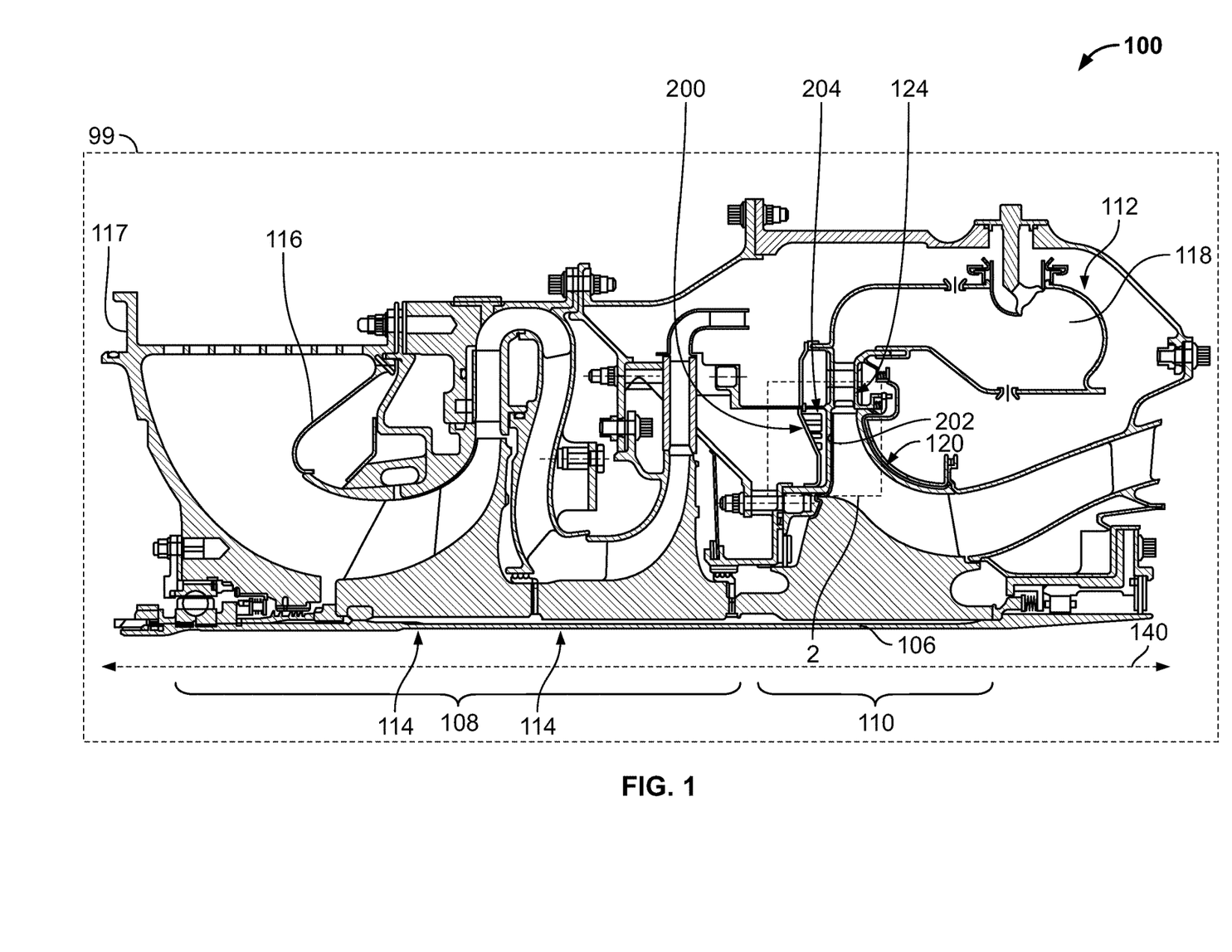
FIG. 1 is a schematic cross-sectional illustration of a gas turbine engine, which includes an exemplary impingement baffle in accordance with the various teachings of the present disclosure.

With reference to FIG. 1, a simplified cross-sectional view of an exemplary gas turbine engine 100 is shown with the remaining portion of the gas turbine engine 100 being axisymmetric about a longitudinal axis 140, which also comprises an axis of rotation for the gas turbine engine 100. As will be discussed herein, the gas turbine engine 100 includes an impingement baffle 200 for directing a cooling fluid onto a target surface 202. The impingement baffle 200 improves the impingement cooling of the target surface 202 by directing the cooling fluid onto the target surface 202 through at least one or more tubular extensions 204. The tubular extensions 204 allow the optimal jet orifice to target surface distance to be maintained while the shape of the impingement baffle 200 provides an increasing cross-sectional area for spent cooling fluid flow to exit without impacting downstream impingement flow.

As will be discussed, the use of the tubular extensions 204 ensure that impingement flow from the upstream tubular extensions 204 does not degrade the incidence angle, temperature, and momentum of the flow impinging from downstream tubular extensions. Generally, the tubular extensions 204, which extend toward the target surface 202, allow the spent fluid flow to flow around or about the tubular extensions 204 to a respective spent fluid exit and not through the fluid or cooling fluid ejected by the respective tubular extension 204, thereby reducing cross-flow. The cooling improvement provided by the cross-flow reduction can be utilized to increase the oxidation and thermally induced low cycle fatigue life, to allow the gas turbine engine 100 to operate at higher gas temperatures, or to utilize less fluid for cooling, which improves specific fuel consumption of the gas turbine engine 100. In one example, the impingement baffle 200 improves specific fuel consumption by about 0.2% and results in about 10% to about 20% improvement in heat transfer with about a 75 degree Fahrenheit reduction in the metal temperature. It should be noted that while the impingement baffle 200 is illustrated and described herein as being used with the gas turbine engine 100, which can be included with an auxiliary power unit, the impingement baffle 200 can be employed with various types of engines, including, but not limited to, turbofan, turboprop, turboshaft, and turbojet engines, whether deployed onboard an aircraft, watercraft, or ground vehicle (e.g., a tank), included within industrial power generators, or utilized within another platform or application. In this example, the gas turbine engine 100 is employed within an aircraft 99.

In the example shown in FIG. 1, the gas turbine engine 100 is illustrated as a single spool engine. It should be noted that the use of a single spool engine is merely exemplary, as any number of spools can be employed. A tie-shaft 106 extends along an axis of rotation or longitudinal axis 140 of the gas turbine engine 100. In this example, the gas turbine engine 100 includes a compressor section 108, a combustion section 112, and a turbine section 110. In certain examples, the compressor section 108 includes one or more compressors 114, which are mounted to an upstream or forward end of the tie-shaft 106. The compressors 114 are in communication with a compressor section duct 116 to receive airflow from an intake section 117 of the gas turbine engine 100. The compressors 114 pressurize the air in the compressor section duct 116, and the compressor section duct 116 is in communication with the combustion section 112 to deliver the compressed air to a combustion chamber 118 of the combustion section 112.

The combustion section 112 includes the combustion chamber 118. The compressed air from the compressor section 108 is mixed with fuel and ignited to produce combustive gases in the combustion chamber 118. The combustive gases are directed from the combustion chamber 118 to the turbine section 110. The turbine section 110 includes at least one radial turbine 120, which is mounted to an opposing, aft end of the tie-shaft 106 as the turbine for the gas turbine engine 100. The turbine section 110 also includes a turbine nozzle 124, which is in fluid communication with the combustion section 112 to receive combustion gases from the combustion chamber 118. The turbine nozzle 124 directs the combustion gases through the radial turbine 120.

The combustion gases drive rotation of the radial turbine 120, which drives further rotation of the tie-shaft 106 and the compressors 114. The rotation of the rotating group provides power output, which may be utilized in a variety of different manners, depending upon whether the gas turbine engine 100 assumes the form of a turbofan, turboprop, turboshaft, turbojet engine, or an auxiliary power unit, to list but a few examples.

Figure 2:
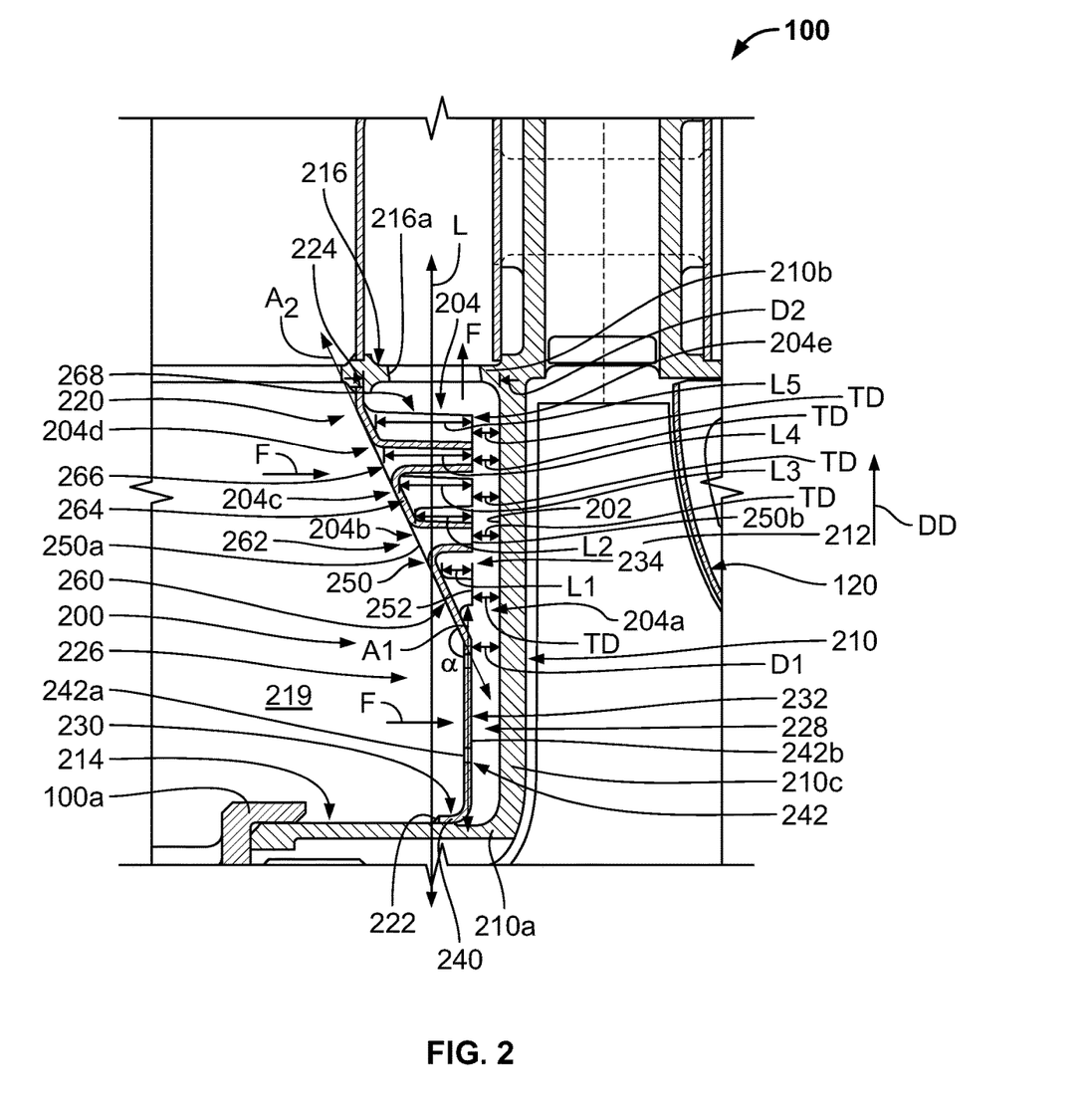
FIG. 2 is a detail cross-sectional view of the impingement baffle coupled to a target surface, such as a back shroud associated with a radial turbine of the gas turbine engine, taken at 2 on FIG. 1 in accordance with various embodiments.

With reference to FIG. 2, a detail cross-sectional view of the gas turbine engine 100 is shown, which illustrates the impingement baffle 200 and the target surface 202. In this example, the target surface 202 is a surface associated with a back shroud 210 of the radial turbine 120. The back shroud 210 is positioned adjacent to a turbine blade 212 associated with the radial turbine 120. It should be noted that in other examples, the target surface 202 may comprise a turbine tip shroud, an inter-stage duct endwall, an axial turbine shroud, combustor, nozzle outer diameter band, nozzle inner diameter band, turbine cases and the like. The back shroud 210 is generally annular, and includes a first flange 214 at a first end 210a, a second flange 216 at a second end 210b and a planar shroud portion 210c that interconnects the first end 210a with the second end 210b. Generally, the back shroud 210 is integrally formed so as to be one-piece or monolithic and may be integrally formed by investment casting, sand casting, forging or wrought material. In addition, the back shroud 210 may be integrally formed so as to be one-piece or monolithic via additively manufacturing such as direct metal laser sintering or electron beam welding, however, other additive manufacturing techniques may be employed. The back shroud 210 is composed of metal or metal alloy, however, the back shroud 210 may be composed of a ceramic based material. It should be noted that while the back shroud 210 is described and illustrated herein as being integrally formed, portions of the back shroud 210 may be separately formed and coupled together via welding, etc.

Figure 3:
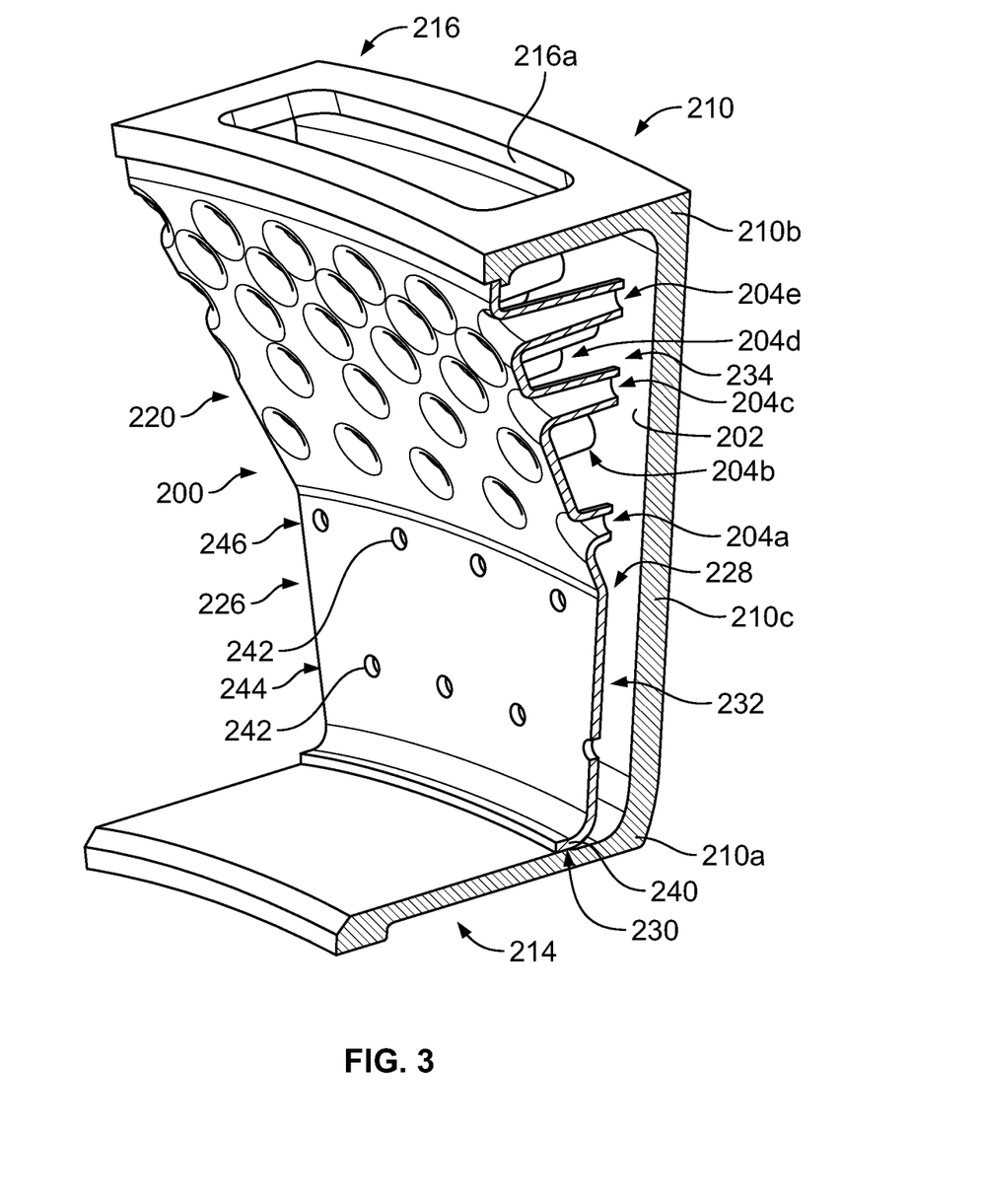
FIG. 3 is a perspective cross-sectional view of a portion of the impingement baffle coupled to a portion of the target surface, such as the back shroud.

The first flange 214 couples the back shroud 210 to the gas turbine engine 100 (FIG. 1). In one example, the first flange 214 is coupled to a structure 100a associated with the gas turbine engine 100. The first flange 214 extends axially from the planar shroud portion 210c at the first end 210a. The second flange 216 extends axially from the planar shroud portion 210c at the second end 210b. The second flange 216 defines one or more spent fluid exits 216a for spent cooling fluid or the cooling fluid after impingement on the back shroud 210. In one example, with reference to FIG. 3, one of the spent fluid exits 216a is shown defined in a portion of the second flange 216. Generally, the spent fluid exits 216a are defined through the second flange 216 so as to be spaced apart about a perimeter or circumference of the back shroud 210. The planar shroud portion 210c extends radially between the first end 210a and the second end 210b. The planar shroud portion 210c is substantially planar. The planar shroud portion 210c is fluidly coupled to the impingement baffle 200 to receive the cooling fluid to cool the back shroud 210. With reference back to FIG. 2, the planar shroud portion 210c is positioned adjacent to the turbine blade 212 associated with the radial turbine 120 and is downstream from the turbine nozzle 124 so as to receive the hot combustion gases from the combustion section 112. The impingement cooling of the back shroud 210 via the impingement baffle 200 improves a life of the back shroud 210 and enables the back shroud 210 to experience higher temperature gas flows from the combustion section 112.

The impingement baffle 200 is in fluid communication with a source of cooling fluid, such as a source of compressor bleed or discharge fluid from the compressor section 108 (FIG. 1), which supplies the cooling fluid F to a plenum 219. The impingement baffle 200 is in fluid communication with and positioned adjacent to the plenum 219 to receive the cooling fluid and directs the cooling fluid onto the target surface 202 or the planar shroud portion 210c of the back shroud 210. Generally, after contacting the target surface 202, the cooling fluid exits through the respective spent fluid exit 216a of the back shroud 210, which is downstream from the impingement baffle 200.

The impingement baffle 200 has a baffle body 220, which includes a first end 222 opposite a second end 224. The baffle body 220 also has a first side 226 opposite a second side 228. The baffle body 220 includes a coupling portion 230, a planar portion or planar cooling portion 232 and an angled portion or angled cooling portion 234. The angled cooling portion 234 includes the tubular extensions 204 as will be discussed. In one example, the baffle body 220 is integrally formed so as to be one-piece or monolithic, via additive manufacturing. The baffle body 220 is composed of metal or metal alloy, however, the baffle body 220 may be composed of a ceramic based material. In one example, the baffle body 220 is composed of INCONEL® alloy 625, and is additively manufactured using direct metal laser sintering, however, other additive manufacturing techniques and materials may be employed. It should be noted that while the baffle body 220 is described and illustrated herein as being integrally formed, portions of the baffle body 220 may be separately formed and coupled together via welding, etc., to form the impingement baffle 200. The baffle body 220 may also be cast.

Figure 4:
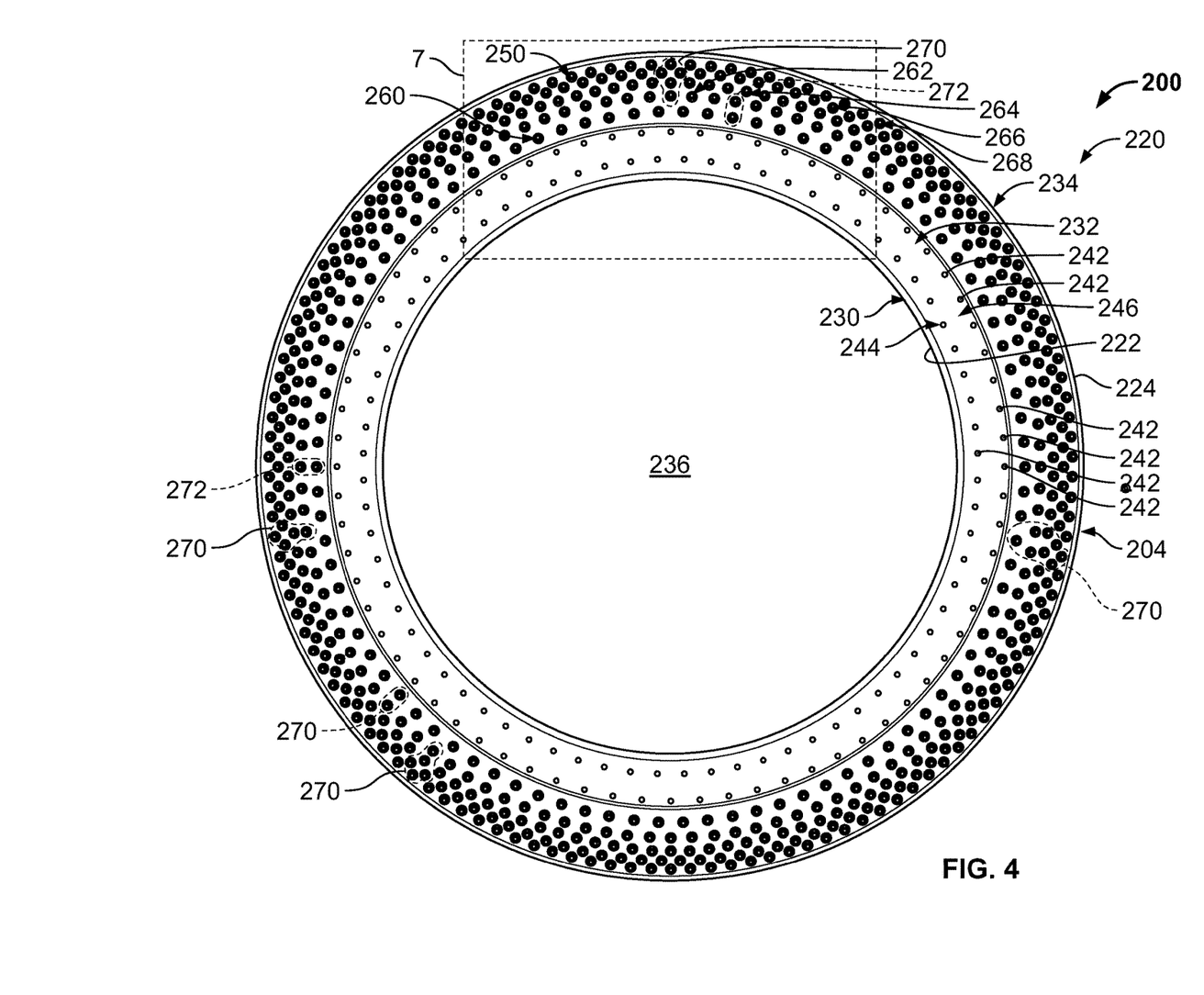
FIG. 4 is a rear view of the impingement baffle, which illustrates a second side of the impingement baffle.

The first end 222 defines a central opening 236, as shown in FIG. 4. Generally, the baffle body 220 is annular. The first end 222 defines an inner perimeter or circumference of the baffle body 220, and the second end 224 defines the outer perimeter or circumference of the baffle body 220. The second end 224 is coupled to the second flange 216 of the back shroud 210 as shown in FIG. 2. With continued reference to FIG. 2, the coupling portion 230 is defined at the first end 222. The coupling portion 230, in one example, is a lip 240, which extends axially outward from the baffle body 220 at the first end 222. Generally, the lip 240 extends at an angle of about 85 degrees to about 95 degrees such that the coupling portion 230 extends along an axis that is transverse to a longitudinal axis L of the baffle body 220. The lip 240 of the coupling portion 230 is coupled to and positioned against the first flange 214 of the back shroud 210 to couple the impingement baffle 200 to the back shroud 210. In one example, the coupling portion 230 is coupled to the back shroud 210 to form a hermetic seal, via welding, for example.

The planar cooling portion 232 is defined on the baffle body 220 between the coupling portion 230 and the angled cooling portion 234. The planar cooling portion 232 extends radially from the first end 222 to the angled cooling portion 234. In cross-section, the planar cooling portion 232 extends along an axis A1, which is substantially parallel to the longitudinal axis L of the baffle body 220 and substantially perpendicular to the longitudinal axis 140 of the gas turbine engine 100 (FIG. 1). The planar cooling portion 232 includes at least one or more first impingement cooling holes 242. The first impingement cooling holes 242 are defined such that an inlet 242a of the respective first impingement cooling hole 242 is on the first side 226 of the baffle body 220, and an outlet 242b of the respective first impingement cooling hole 242 is on the second side 228 of the baffle body 220. In this example, the first impingement cooling holes 242 do not include or are devoid of the tubular extensions 204. The first impingement cooling holes 242 are defined through the planar cooling portion 232 as respective cylindrical holes, which terminate at the second side 228 of the baffle body 220. The inlet 242a is in fluid communication with the plenum 219 to receive the cooling fluid, and the outlet 242b is in fluid communication with the target surface 202 of the back shroud 210 to direct the cooling fluid to the target surface 202 of the back shroud 210.

With reference to FIG. 4, the first impingement cooling holes 242 may be defined in two circular arrays 244, 246 along the planar cooling portion 232. In this example, the first impingement cooling holes 242 of the first circular array 244 are offset from or staggered relative to the first impingement cooling holes 242 of the second circular array 246 about the perimeter of the baffle body 220. Generally, each of the first impingement cooling holes 242 of the first circular array 244 are not radially aligned with or are offset from the first impingement cooling holes 242 of the second circular array 246. By being offset about the perimeter of the baffle body 220, the cooling fluid from the first impingement cooling holes 242 of the first circular array 244 may flow downstream with minimal interruption or disturbance of the flow of the cooling fluid from the first impingement cooling holes 242 of the second circular array 246. Stated another away, the first impingement cooling holes 242 of the first circular array 244 are upstream from the first impingement cooling holes 242 of the second circular array 246. The cooling fluid from the first impingement cooling holes 242 of the first circular array 244 must flow past the first impingement cooling holes 242 of the second circular array 246 to reach the respective spent fluid exit 216a. By staggering or offsetting the first impingement cooling holes 242, the cooling fluid flow from the first impingement cooling holes 242 of the first circular array 244 does not interfere with or mix with the cooling fluid flow from the first impingement cooling holes 242 of the second circular array 246. This improves heat transfer between the cooling fluid and the target surface 202 of the back shroud 210 in the planar cooling portion 232 of the baffle body 220.

With reference back to FIG. 2, the angled cooling portion 234 extends from the planar cooling portion 232 to the second end 224. In cross-section, the angled cooling portion 234 extends along an axis A2, which is transverse to the longitudinal axis L of the baffle body 220 and is transverse to the axis A1 of the planar cooling portion 232. The angled cooling portion 234 is also transverse to the longitudinal axis 140 of the gas turbine engine 100 (FIG. 1). Stated another way, the angled cooling portion 234 extends at an angle α defined on the first side 226 between the planar cooling portion 232 and the angled cooling portion 234. The angle α is about 125 degrees to about 145 degrees, and in one example, is about 135 degrees. Generally, at a first end 234a of the angled cooling portion 234, the second side 228 of the baffle body 220 is spaced a first distance D1 from the back shroud 210, and at an opposite second end 234b of the angled cooling portion 234, the second side 228 of the baffle body 220 is spaced a second distance D2 from the back shroud 210. The second distance D2 is different, and greater than, the first distance D1. The second side 228 of the baffle body 220 along the planar cooling portion 232 is also spaced the distance D1 from the back shroud 210.

Generally, the distances D1, D2 between the second side 228 of the baffle body 220 and the target surface 202 of the back shroud 210 varies from the first end 222 of the baffle body 220 to the second end 224. In this example, the distance D1 defined between the second side 228 of the baffle body 220 and the target surface 202 of the back shroud 210 is constant along the planar cooling portion 232, and the distance between the second side 228 of the baffle body 220 and the back shroud 210 increases from the distance D1 at the first end 234a of the angled cooling portion 234 to the distance D2 at the second end 234b. By varying the distances D1, D2 between the second side 228 and the target surface 202 of the back shroud 210 along the first end 222 and the second end 224 of the baffle body 220, a volume defined between the second side 228 and the back shroud 210 varies or increases, which provides space for the spent cooling fluid to flow from upstream impingement cooling holes, such as the first impingement cooling holes 242, to the respective spent fluid exit 216a. By increasing the volume between the second side 218 and the back shroud 210, additional space is provided for spent flow to make its way to the respective spent fluid exit 216a without crossing through downstream impingement flows. This reduces the degradation of the impingement cooling effectiveness due to cross-flow, which improves heat transfer between the cooling fluid and the target surface 202. In addition, the reduction in cross-flow degradation also enables less of the compressor discharge fluid to be provided to the plenum 219 for use by the impingement baffle 200, while the desired temperature for the back shroud 210 is maintained, which improves the specific fuel consumption of the gas turbine engine 100. The angled cooling portion 234 increases the cross-sectional area for spent fluid to flow to the respective spent fluid exit 216a in proportion with the amount of spent flow, which increases in the radial direction. The increased area for the spent flow decreases the amount of spent flow flowing through the area occupied by the downstream jets of the downstream tubular extensions 204, which increases the heat transfer efficacy of the downstream tubular extensions 204.

Figure 5A:
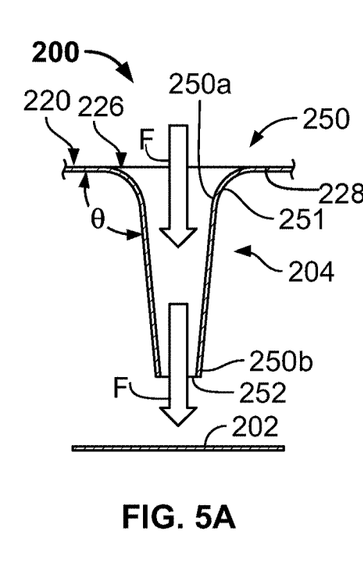
FIG. 5A is a cross-section of one exemplary impingement cooling hole and tubular extension for use with the impingement baffle, taken along line 5A-5A of FIG. 7.

The angled cooling portion 234 defines a plurality of second impingement cooling holes 250. In one example, each of the second impingement cooling holes 250 is fluidly coupled to a respective one of the tubular extensions 204, which extend outwardly from the second side 228 of the baffle body 220. Each of the second impingement cooling holes 250 includes a second inlet 250a fluidly coupled to the plenum 219, and a second outlet 250b defined by a terminal end 252 of the respective tubular extension 204. In one example, with reference to FIG. 5A, a cross-section of one of the second impingement cooling holes 250 coupled to or integrally formed with one of the tubular extensions 204 is shown, with the understanding that a remainder of the second impingement cooling holes 250 and the tubular extensions 204 associated with the baffle body 220 are the same. In the example of FIG. 5A, the second inlet 250a of the second impingement cooling hole 250 has a rounded entrance 251 about the second inlet 250a. Generally, the rounded entrance 251 is defined as a smooth and continuous transition that is tangent to both surfaces (the baffle body 220 and the tubular extension 204) and maintains a substantially constant radius of curvature. In one example, an angle θ is defined between the second side 228 of the baffle body 220 and the tubular extension 204 at the second inlet 250a, and the angle θ is greater than 90 degrees. The tubular extension 204 is tapered to the terminal end 252 such that a flow path for the cooling fluid F defined by the second impingement cooling hole 250 and the tubular extension 204 converges to the second outlet 250b. Stated another way, the second inlet 250a has a diameter that is different, and greater than, the second outlet 250b. By providing the second impingement cooling hole 250 with the tubular extension 204 having a converging flow path as shown in FIG. 5A, pressure drop through the second impingement cooling hole 250 to the terminal end 252 is reduced. The rounded entrance of the second inlet 250a also reduces pressure drop through the second impingement cooling hole 250 to the second outlet 250b. In addition, the tapered shape of the tubular extension 204 that results in the converging flow path increases an area between adjacent ones of the tubular extensions 204, which enables spent cooling flow from upstream impingement cooling holes 242, 250 to flow to the respective spent fluid exit 216a without interfering with or disrupting the cooling fluid flow through the downstream second impingement cooling holes 250 and tubular extensions 204.

Figure 5B:
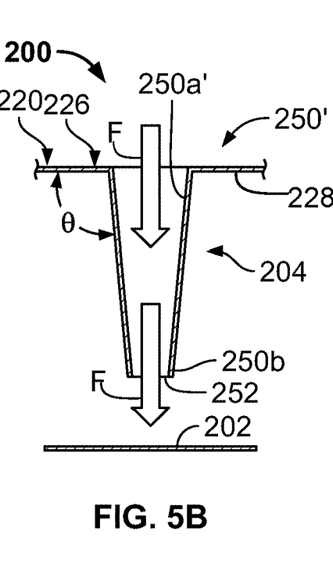
FIG. 5B is a cross-section of another exemplary impingement cooling hole and tubular extension for use with the impingement baffle.
Figure 7:
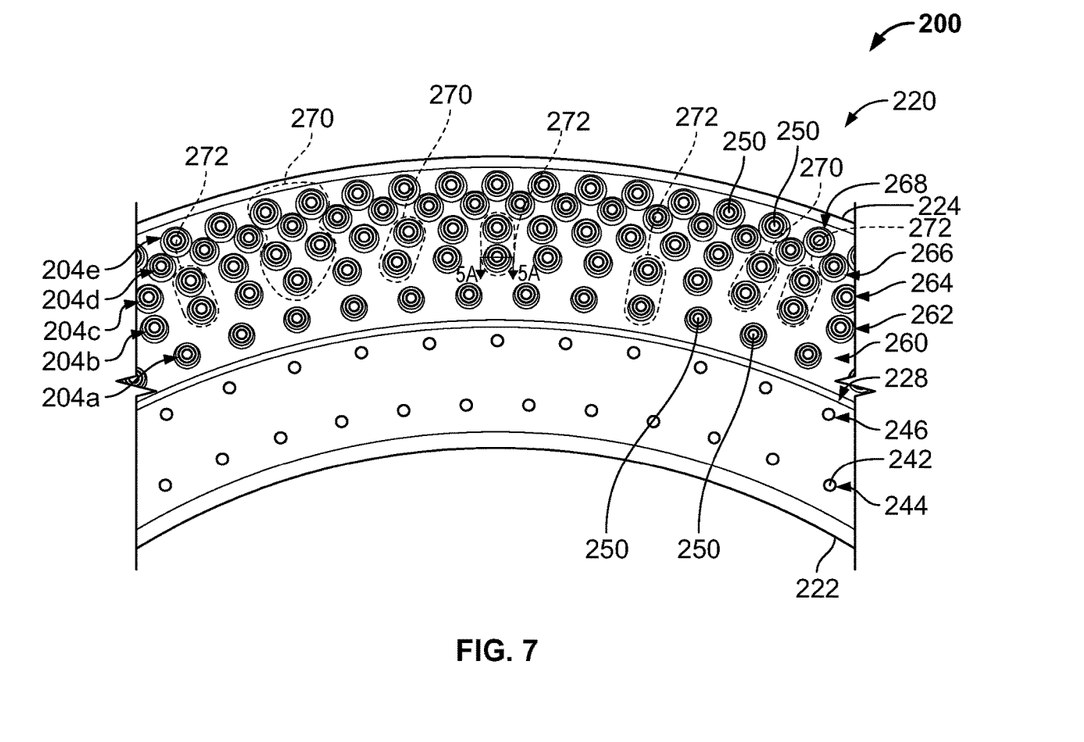
FIG. 7 is a detailed rear view a portion of the impingement baffle taken at 7 on FIG. 4.

In other examples, the second impingement cooling holes 250 may be configured differently to direct the cooling fluid onto the target surface 202. With reference to FIG. 5B, a cross-section of an exemplary second impingement cooling hole 250' coupled to or integrally formed with one of the tubular extensions 204 is shown, which is taken from the perspective of line 5A-5A in FIG. 7. In the example of FIG. 5B, a second inlet 250a' of the second impingement cooling hole 250' has a sharp corner defined about the second inlet 250a' such that the second inlet 250a' is circular. In one example, the angle θ is defined between the second side 228 of the baffle body 220 and the tubular extension 204 at the second inlet 250a', and the angle θ is greater than 90 degrees. In FIG. 5B, the respective tubular extension 204 is also tapered to the terminal end 252 such that a flow path for the cooling fluid F defined by the second impingement cooling hole 250' and the tubular extension 204 converges to the second outlet 250b. The second inlet 250a' has a diameter that is different, and greater than, the second outlet 250b. By providing the second impingement cooling hole 250' with the tubular extension 204 that has a converging flow path as shown in FIG. 5B, pressure drop through the second impingement cooling hole 250 to the terminal end 252 is reduced. In addition, the tapered shape of the tubular extension 204 that results in the converging flow path increases an area between adjacent ones of the tubular extensions 204, which enables spent cooling flow from upstream impingement cooling holes 242, 250 to flow to the respective spent fluid exit 216a without interfering with or disrupting the cooling fluid flow through the downstream second impingement cooling holes 250.

Figure 5C:
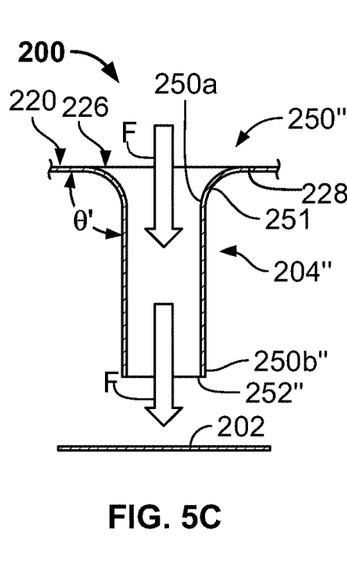
FIG. 5C is a cross-section of yet another exemplary impingement cooling hole and tubular extension for use with the impingement baffle.

In other examples, the second impingement cooling holes 250 may be configured differently to direct the cooling fluid onto the target surface 202. With reference to FIG. 5C, a cross-section of an exemplary second impingement cooling hole 250" coupled to or integrally formed with a tubular extension 204" is shown, which is taken from the perspective of line 5A-5A in FIG. 7. In the example of FIG. 5C, the second inlet 250a has the rounded entrance 251 defined in the baffle body 220 about the second inlet 250a. In one example, an angle θ' is defined between the second side 228 of the baffle body 220 and the tubular extension 204" at the second inlet 250a, and the angle θ' is about 90 degrees. In FIG. 5C, the tubular extension 204" is cylindrical such that a flow path for the cooling fluid F defined by the second impingement cooling hole 250" and the tubular extension 204" does not converge to a second outlet 250b". The second inlet 250a has a diameter that is substantially the same as the second outlet 250b". The rounded entrance of the second inlet 250a also reduces pressure drop through the second impingement cooling hole 250".

Figure 5D:
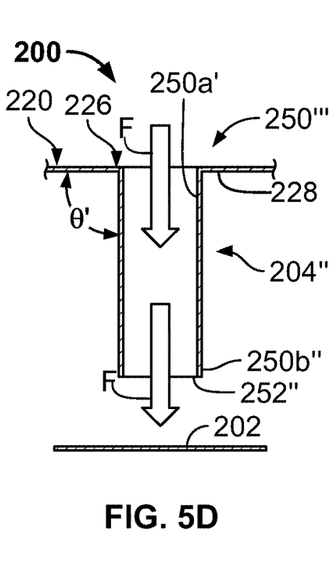
FIG. 5D is a cross-section of yet another exemplary impingement cooling hole and tubular extension for use with the impingement baffle.

In other examples, the second impingement cooling holes 250 may be configured differently to direct the cooling fluid onto the target surface 202. With reference to FIG. 5D, a cross-section of an exemplary second impingement cooling hole 250'" coupled to or integrally formed with the tubular extension 204" is shown, which is taken from the perspective of line 5A-5A in FIG. 7. In the example of FIG. 5D, the second inlet 250a' has the sharp entrance defined in the baffle body 220 about the second inlet 250a'. The angle θ' is defined between the second side 228 of the baffle body 220 and the tubular extension 204". In FIG. 5D, the respective tubular extension 204" is cylindrical such that a flow path for the cooling fluid F defined by the second impingement cooling hole 250''' and the tubular extension 204" does not converge to the second outlet 250b''. The second inlet 250a'' has a diameter that is substantially the same as the second outlet 250b''. Generally, the second impingement cooling holes 250 of FIG. 5A have the least pressure loss, followed by the second impingement cooling holes 250" of FIG. 5C, the second impingement cooling holes 250' of FIG. 5B and the second impingement cooling holes 250''' of FIG. 5D. The pressure of the fluid that is not lost in the jet created by the respective tubular extension 204, 204" may be used to increase velocity for a fixed mass flow rate and available pressure drop. It should be noted that while the baffle body 220 is described herein as including the same second impingement cooling holes 250, 250', 250", 250''' and tubular extensions 204, 204", the angled cooling portion 234 of the baffle body 220 may include any combination of the second impingement cooling holes 250, 250', 250", 250''' and tubular extensions 204, 204" as desired. In addition, an area of the fluid flow path defined by the tubular extensions 204, 204" may be varied depending upon the position of the tubular extension 204, 204" on the baffle body 220, and need not be the same as shown.

The tubular extensions 204 minimize entrainment of spent cooling fluid into downstream impingement cooling holes 250. With reference to FIG. 4, the second impingement cooling holes 250 are defined in the angled cooling portion 234 in a plurality of circular arrays: a third circular array 260, a fourth circular array 262, a fifth circular array 264, a sixth circular array 266 and a seventh circular array 268. Each circular array 260-268 includes a plurality of the second impingement cooling holes 250, which are each associated with a respective plurality of the tubular extensions 204a-204e. In this regard, with reference to FIG. 2, the tubular extensions 204a-204e associated with each of the respective one of the circular arrays 260-268 has a length L1-L5, which is predetermined such that a terminal distance TD defined by the terminal end 252 of the respective one of the tubular extensions 204a-204e is the same. Each of the lengths L1-L5 are different, and generally, each of the lengths L1-L5 increases in a downstream direction DD or in a direction moving toward the second end 224 due to the angle α of the angled cooling portion 234. Stated another way, the length L1-L5 of the tubular extensions 204a-204e is based on a distance the second side 228 of the baffle body 220 is spaced apart from the target surface 202. Thus, the length L1 of the tubular extension 204a is different and less than the length L2 of the tubular extension 204b; the length L3 of the tubular extension 204c; the length L4 of the tubular extension 204d; and the length L5 of the tubular extension 204e. The length L2 is different and less than the lengths L3-L5. Similarly, the length L3 is different and less than the lengths L4 and L5. The length L4 is different and less than the length L5. The length L5 is different and greater than the lengths L1-L4. By providing the different lengths L1-L5, while maintaining the terminal end 252 positioned at the terminal distance TD, the baffle body 220 ensures that the cooling fluid contacts the target surface 202 to provide a predetermined amount of cooling at the target surface 202. Generally, the cooling requirements of the target surface 202 and the terminal distance TD may be predetermined using computational fluid dynamics (CFD) analysis and the terminal distance TD is predetermined using CFD analysis. It should be noted that while the terminal distance TD is described and illustrated herein as being the same between all of the tubular extensions 204, in certain embodiments, the terminal distance TD may be varied amongst the tubular extensions 204, if so determined based on the CFD analysis.

Figure 6:
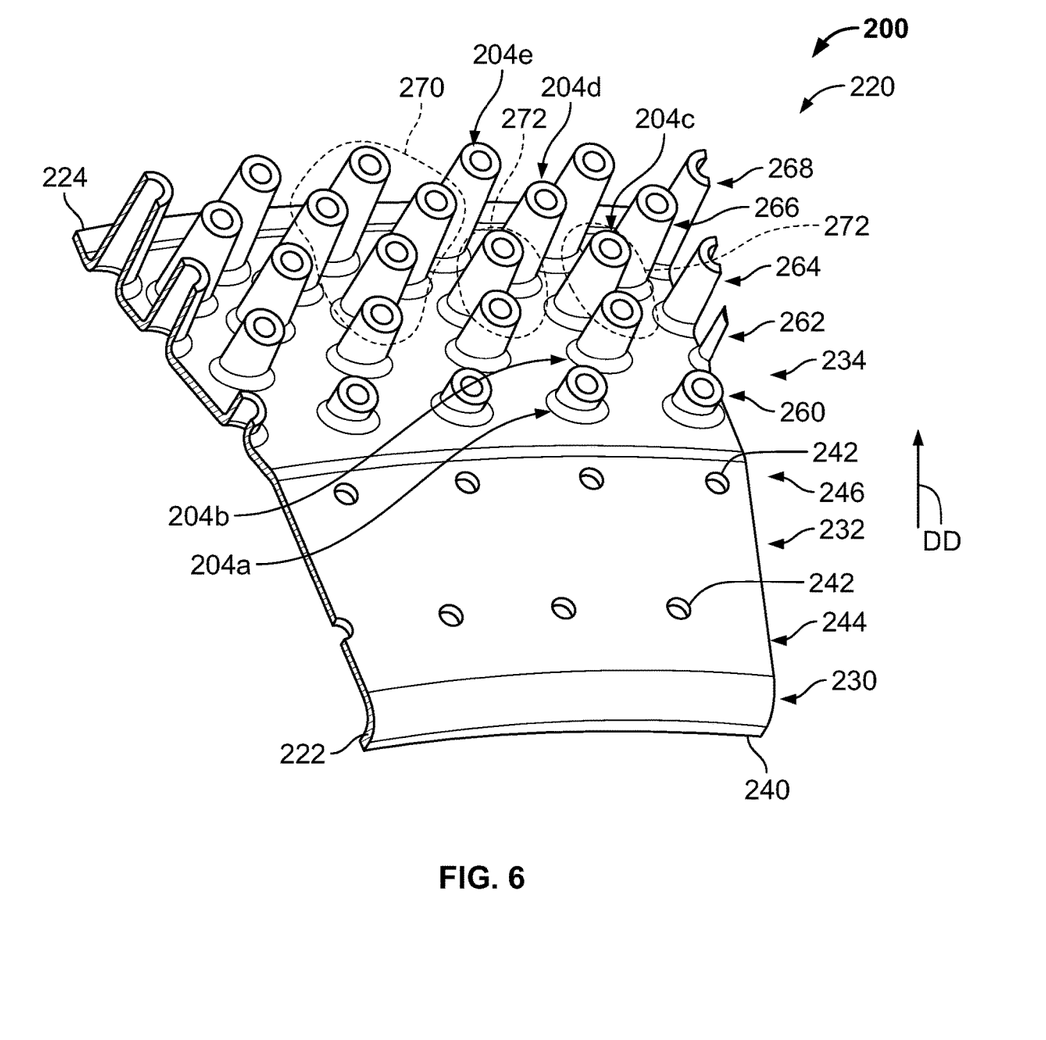
FIG. 6 is a detailed perspective rear view of a portion of the impingement baffle.

In addition, with reference to FIG. 6, a perspective view of a portion of the baffle body 220 is shown. As shown, a density or concentration of the second impingement cooling holes 250 and the respective tubular extensions 204a-204e varies and increases in the downstream direction DD or from the first end 222 of the baffle body 220 to the second end 224. Generally, a number of the second impingement cooling holes 250 and the tubular extensions 204a of the third circular array 260 is different and less than a number of the second impingement cooling holes 250 and the tubular extensions 204b of the fourth circular array 262; a number of the second impingement cooling holes 250 and the tubular extensions 204c of the fifth circular array 264; a number of the second impingement cooling holes 250 and the tubular extensions 204d of the sixth circular array 266; and a number of the second impingement cooling holes 250 and the tubular extensions 204e of the seventh circular array 268. Similarly, the number of the second impingement cooling holes 250 and the tubular extensions 204b of the fourth circular array 262 is different and less than the number of the second impingement cooling holes 250 and the tubular extensions 204c of the fifth circular array 264; the number of the second impingement cooling holes 250 and the tubular extensions 204d of the sixth circular array 266; and the number of the second impingement cooling holes 250 and the tubular extensions 204e of the seventh circular array 268. The number of the second impingement cooling holes 250 and the tubular extensions 204c of the fifth circular array 264 is different and less than the number of the second impingement cooling holes 250 and the tubular extensions 204d of the sixth circular array 266; and the number of the second impingement cooling holes 250 and the tubular extensions 204e of the seventh circular array 268. The number of the second impingement cooling holes 250 and the tubular extensions 204d of the sixth circular array 266 is different and less than the number of the second impingement cooling holes 250 and the tubular extensions 204e of the seventh circular array 268. Generally, the number of the second impingement cooling holes 250 and the respective tubular extensions 204e of the seventh circular array 268 is the greatest as the seventh circular array 268 is proximate the second end 224 of the baffle body 220, which in turn, is positioned in the closest proximity to the turbine nozzle 124 and thus, the combustion gases. The number of the second impingement cooling holes 250 and the tubular extensions 204a of the third circular array 260 is also different and greater than the number of first impingement cooling holes 242 of the first circular array 244 and the second circular array 246. It should be noted, however, that the hole density of the second impingement cooling holes 250 may be varied to match flow path heat loading, and in this example, the flow path heat loading is highest near a leading edge of the radial turbine 120. In other examples, the hole density of the second impingement cooling holes 250 may be different based on the heat loading of the associated target surface. The tubular extensions 204 generally increase heat transfer independent of the distribution of the second impingement cooling holes 250 and driving flow path heat loading.

Generally, the number of the second impingement cooling holes 250 and the respective tubular extensions 204a-204e is predetermined based on the cooling requirements associated with the target surface 202 using CFD analysis. In one example, with reference to FIG. 7, due to the differences in the number of the second impingement cooling holes 250 and the respective tubular extensions 204a-204e amongst the circular arrays 260-268, one or more clusters 270 of the second impingement cooling holes 250 and the respective tubular extensions 204a-204e may be offset or radially misaligned about the perimeter or circumference of the baffle body 220 (see also FIG. 4). In addition, due to the differences in the number of the second impingement cooling holes 250 and the respective tubular extensions 204a-204e amongst the circular arrays 260-268, one or more clusters 272 of the second impingement cooling holes 250 and the respective tubular extensions 204a-204e may be radially aligned about the perimeter or circumference of the baffle body 220 (see also FIG. 4). This non-uniform distribution of the second impingement cooling holes 250 and the respective tubular extensions 204a-204e about the perimeter or circumference of the baffle body 220 makes the presence of additional volume provided by the angled cooling portion 234 between the adjacent tubular extensions 204a-204e more beneficial as it enables the spent cooling fluid to reach the respective spent fluid exit 216a (FIG. 3) with reduced cross-flow degradation or with a reduced disruption of the cooling flow guided onto the target surface 202 (FIG. 3) by a downstream second impingement cooling hole 250 and the respective tubular extension 204. Stated another way, the second impingement cooling holes 250 and the respective tubular extensions 204a-204e, which are spaced circumferentially and radially in a non-uniform manner to provide optimum cooling of the target surface 202, have a greatly reduced cross-flow degradation or disruptions in the flow of downstream second impingement cooling holes 250 and the respective tubular extensions 204. The reduction in cross-flow degradation ensures that the cooling fluid exiting the terminal ends 252 of the respective tubular extensions 204 contacts the target surface 202 to provide heat transfer.

With reference to FIG. 2, with the baffle body 220 formed, the impingement baffle 200 is coupled to the back shroud 210 such that the second end 224 of the baffle body 220 is coupled to the second flange 216 of the back shroud 210 and the first end 222 is coupled to the first flange 214 of the back shroud 210. With the impingement baffle 200 coupled to the back shroud 210, as the gas turbine engine operates, the hot combustion gases from the combustion chamber 118 (FIG. 1) flow through the turbine nozzle 124 and contact the back shroud 210 and the radial turbine 120. The combustive gases drive rotation of the radial turbine 120, which drives rotation of the compressors 114.

During the operation of the gas turbine engine 100, the cooling fluid F is supplied to the plenum 219 by the source of cooling fluid, such as a small portion of the compressor discharge fluid (about 1% to about 5%) from the compressor section 108. The impingement baffle 200, which is in fluid communication with the plenum 219, receives the cooling fluid F, and directs the cooling fluid through the first impingement cooling holes 242 and the second impingement cooling holes 250. The tubular extension 204a-204e coupled to or integrally formed with the second impingement cooling holes 250 directs the cooling fluid onto the target surface 202 while minimizing cross-flow degradation from upstream impingement cooling holes 242, 250. In addition, the angle α of the angled cooling portion 234 provides increased volume for spent cooling fluid to flow downstream to the respective spent fluid exit 216a with reduced cross-flow degradation or disruption of the impingement cooling fluid provided by downstream ones of the impingement cooling holes 242, 250. Further, the staggering or non-uniform distribution of the second impingement cooling holes 250 and the respective tubular extensions 204a-204e benefits from the increased volume provided by the angled cooling portion 234 to enable the spent cooling fluid to exit into the respective spent fluid exit 216a with reduced cross-flow degradation. In addition, the density or concentration of the second impingement cooling holes 250 and the respective tubular extensions 204a-204e, which increases in the downstream direction DD, ensures that the back shroud 210 is cooled adequately and provides a greater number of the second impingement cooling holes 250 and the respective tubular extensions 204a-204e at the second end 224 of the baffle body 220, which is in closest proximity to the turbine nozzle 124. In addition, although not illustrated herein, the impingement baffle 200 may include cross-flow protectors or other heat transfer augmentation features, if desired. It should also be noted that the tubular extensions 204, 204" may be employed with other structures, and the baffle body 220 described herein is merely one example.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A gas turbine engine, comprising:
 a shroud having a first shroud end opposite a second shroud end and defining a target surface between the first shroud end and the second shroud end, the second shroud end including at least one fluid exit;
 an impingement baffle for directing a cooling fluid onto the target surface, the impingement baffle including:
  a baffle body having a first end opposite a second end, and a first side opposite a second side, the first end coupled to the first shroud end and the second end coupled to the second shroud end, the second side spaced a distance apart from the target surface, with the distance increasing between the second side and the target surface from proximate the first end to the second end to direct the cooling fluid through the at least one fluid exit, the baffle body defining a plurality of impingement holes that extend through the baffle body from the first side to the second side, the plurality of impingement holes spaced apart along the baffle body from the first end to the second end with each of the plurality of impingement holes configured to receive the cooling fluid; and a plurality of tubular extensions coupled to the second side of the baffle body, each tubular extension of the plurality of tubular extensions in fluid communication with a respective one of the plurality of impingement holes to direct the cooling fluid from the respective one of the plurality of impingement holes onto the target surface, with each tubular extension of the plurality of tubular extensions extending for a length from the second side, and the length of each tubular extension of the plurality of tubular extensions is based on the distance.

2. The gas turbine engine of claim 1, wherein a density of the plurality of impingement holes and the plurality of tubular extensions increases from the first end toward the second end.

3. The gas turbine engine of claim 1, wherein the length associated with each tubular extension of the plurality of tubular extensions increases from the first end to the second end.

4. The gas turbine engine of claim 1, wherein a second distance is defined between a terminal end of each tubular extension of the plurality of tubular extensions and the target surface, and the second distance is the same for each tubular extension of the plurality of tubular extensions.

5. The gas turbine engine of claim 1, wherein at least one of the plurality of impingement holes has an inlet configured to be in fluid communication with a source of the cooling fluid and an outlet spaced apart from the target surface and defined by a terminal end of a respective one of the plurality of tubular extensions, and the inlet includes a rounded entrance.

6. The gas turbine engine of claim 5, wherein the respective one of the plurality of tubular extensions converges from the inlet to the terminal end.

7. The gas turbine engine of claim 5, wherein the respective one of the plurality of tubular extensions is cylindrical.

8. The gas turbine engine of claim 1, wherein at least one of the plurality of impingement holes has an inlet configured to be in fluid communication with a source of the cooling fluid and an outlet spaced apart from the target surface and defined by a terminal end of a respective one of the plurality of tubular extensions, and the inlet includes a sharp corner.

9. The gas turbine engine of claim 8, wherein the respective one of the plurality of tubular extensions converges from the inlet to the terminal end.

10. The gas turbine engine of claim 8, wherein the respective one of the plurality of tubular extensions is cylindrical.

11. The gas turbine engine of claim 1, wherein the baffle body includes a planar portion proximate the first end and an angled portion defined between the planar portion and the second end, the plurality of impingement holes includes a plurality of first impingement holes associated with the planar portion and a plurality of second impingement holes associated with the angled portion, and the distance between the second side and the target surface along the planar portion is the same.

12. The gas turbine engine of claim 11, wherein the distance between the second side and the target surface along the angled portion increases from the planar portion to the second end.

13. The gas turbine engine of claim 11, wherein the plurality of tubular extensions are coupled to the plurality of second impingement holes.

14. The gas turbine engine of claim 13, wherein the plurality of second impingement holes and the plurality of tubular extensions are non-uniformly spaced about a perimeter of the baffle body along the angled portion.

15. The gas turbine engine of claim 13, wherein at least one of the plurality of second impingement holes and a respective one of the plurality of tubular extensions is radially aligned with an adjacent one of the plurality of second impingement holes and a respective adjacent one of the plurality of tubular extensions, and at least a second one of the plurality of second impingement holes and a respective second one of the plurality of tubular extensions is radially misaligned with a second adjacent one of the plurality of second impingement holes and a respective second adjacent one of the plurality of tubular extensions.

16. The gas turbine engine of claim 1, wherein the shroud is associated with a radial turbine of a gas turbine engine, and the shroud is positioned adjacent to a turbine blade of the radial turbine and is configured to receive combustion gases from a turbine nozzle associated with the gas turbine engine.

17. A gas turbine engine, comprising:
a radial turbine having a turbine blade configured to receive combustion gases from a turbine nozzle;
a shroud having a first shroud end opposite a second shroud end and defining a target surface between the first shroud end and the second shroud end, the second shroud end including at least one fluid exit, the shroud positioned adjacent to the turbine blade and configured to receive the combustion gases, the shroud downstream from the turbine nozzle;
an impingement baffle for directing a cooling fluid onto the target surface, the impingement baffle including:
a baffle body having a first end opposite a second end, a first side opposite a second side, the first end coupled to the first shroud end and the second end coupled to the second shroud end, a planar portion that extends from proximate the first end to an angled portion that extends from the planar portion to the second end, the second side along the angled portion spaced a distance apart from the target surface that increases from the planar portion to the second end to direct the cooling fluid through the at least one fluid exit, the baffle body defining a plurality of impingement holes that extend through the baffle body from the first side to the second side, the plurality of impingement holes spaced apart along the baffle body from the first end to the second end with each of the plurality of impingement holes configured to receive the cooling fluid; and
a plurality of tubular extensions coupled to the second side of the baffle body along the angled portion, each tubular extension of the plurality of tubular extensions in fluid communication with a respective one of the plurality of impingement holes defined in the angled portion to direct the cooling fluid from the respective one of the plurality of impingement holes onto the target surface, with each tubular extension of the plurality of tubular extensions extending for a length from the second side such that a second distance defined between a terminal end of each tubular extension of the plurality of tubular extensions and the target surface is the same for each tubular extension of the plurality of tubular extensions.

18. The gas turbine engine of claim 17, wherein a density of the plurality of impingement holes and the plurality of tubular extensions increases toward the second end along the angled portion, and the plurality of impingement holes and the plurality of tubular extensions are non-uniformly spaced about a perimeter of the baffle body along the angled portion.

19. The gas turbine engine of claim 17, wherein at least one of the plurality of impingement holes has an inlet configured to be in fluid communication with a source of the cooling fluid and an outlet spaced apart from the target surface and defined by the terminal end of a respective one of the plurality of tubular extensions, and the inlet includes a rounded entrance.

20. The gas turbine engine of claim 19, wherein the respective one of the plurality of tubular extensions converges from the inlet to the terminal end.

* * * * *